INVENTOR
SAMUEL LUBKIN
BY S.C. Yuter
ATTORNEY

Sept. 4, 1956     S. LUBKIN     2,762,038
VOLTAGE MEASURING DEVICE

Filed June 11, 1952     3 Sheets-Sheet 2

FIG. 2

| Step | Ea | Eb | Ec | Ed | Ee | Ef | X≥E | X<E | Relay | 1/2 | 1/4 | 1/8 | 1/16 | 1/32 | 1/64 | Result |
|---|---|---|---|---|---|---|---|---|---|---|---|---|---|---|---|---|
| a | 1/2 | 1/4 | 1/8 | 1/16 | 1/32 | 1/64 | ▨ | | #1 Oper. | .1 | | | | | | 1/2 |
| b | 1 | 3/4 | 5/8 | 9/16 | 17/32 | 33/64 | | ▨ | #2 Inoper. | .1 | 0 | | | | | 1/2 |
| c | 1 | 3/4 | 5/8 | 9/16 | 17/32 | 33/64 | | ▨ | #3 Inoper. | .1 | 0 | 0 | | | | 1/2 |
| d | 1 | 3/4 | 5/8 | 9/16 | 17/32 | 33/64 | ▨ | | #4 Oper. | .1 | 0 | 0 | 1 | | | 9/16 |
| e | 1 | 3/4 | 5/8 | 5/8 | 19/32 | 37/64 | | ▨ | #5 Inoper. | .1 | 0 | 0 | 1 | 0 | | 9/16 |
| f | 1 | 3/4 | 5/8 | 5/8 | 19/32 | 37/64 | | ▨ | #6 Inoper. | .1 | 0 | 0 | 1 | 0 | 0 | X=9/16 |

FIG. 3

| Step | Ea | Eb | Ec | Ed | Ee | Ef | X≥E | X<E | Relay | 1/2 | 1/4 | 1/8 | 1/16 | 1/32 | 1/64 | Result |
|---|---|---|---|---|---|---|---|---|---|---|---|---|---|---|---|---|
| a | 1/2 | 1/4 | 1/8 | 1/16 | 1/32 | 1/64 | | ▨ | #1 Inoper. | .0 | | | | | | 0 |
| b | 1/2 | 1/4 | 1/8 | 1/16 | 1/32 | 1/64 | | ▨ | #2 Inoper. | .0 | 0 | | | | | 0 |
| c | 1/2 | 1/4 | 1/8 | 1/16 | 1/32 | 1/64 | ▨ | | #3 Oper. | .0 | 0 | 1 | | | | 1/8 |
| d | 1/2 | 1/4 | 1/4 | 3/16 | 5/32 | 9/64 | | ▨ | #4 Inoper. | .0 | 0 | 1 | 0 | | | 1/8 |
| e | 1/2 | 1/4 | 1/4 | 3/16 | 5/32 | 9/64 | ▨ | | #5 Oper. | .0 | 0 | 1 | 0 | 1 | | 5/32 |
| f | 1/2 | 1/4 | 1/4 | 3/16 | 3/16 | 11/64 | | ▨ | #6 Inoper. | .0 | 0 | 1 | 0 | 1 | 0 | X=5/32 |

INVENTOR
SAMUEL LUBKIN
BY S. C. Yuter
ATTORNEY

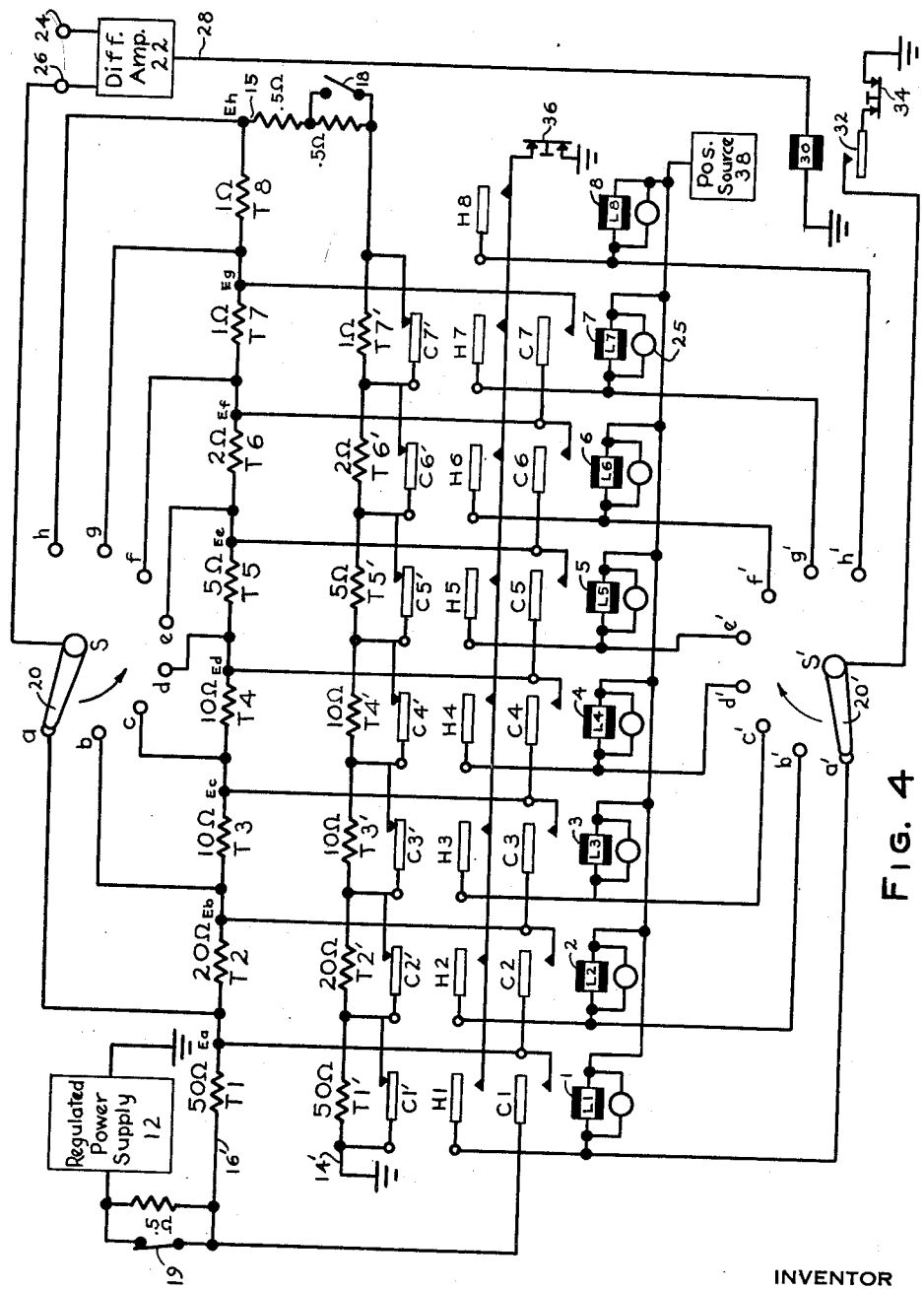

United States Patent Office 2,762,038
Patented Sept. 4, 1956

2,762,038

VOLTAGE MEASURING DEVICE

Samuel Lubkin, Brooklyn, N. Y., assignor, by mesne assignments, to Underwood Corporation, New York, N. Y., a corporation of Delaware Application June 11, 1952, Serial No. 293,023

8 Claims. (Cl. 340—347)

This invention relates to voltage measurements and more particularly to a method and apparatus for converting a voltage of a given magnitude into digital numerical form.

High speed devices are being used to solve many of the computational problems of science, business and government. These devices are either digital or analog computers. An analog computer converts numbers for the purpose of computation into physically measurable quantities which can have continually changing values, such as voltages. A digital computer performs mathematical operations with numbers expressed in the form of digits which can assume only discrete values.

Computers handle data quickly and efficiently from origin to final state. However, the original data may be in analog form, for example a voltage, and the computer may be a digital device which can only operate on numbers. Therefore it is necessary to convert the analog quantity representing data to digital form in order to insert the information into the computer.

A similar problem exists where a voltage magnitude conveying information is to be directly transmitted to a remote point, since voltage magnitude transmission is usually impractical.

An object of my invention, therefore, is to provide an improved method and apparatus for obtaining an accurate numerical representation of the magnitude of a voltage.

Another object of my invention is to provide apparatus for converting analog quantities represented by voltages into digital form automatically and rapidly for use in a digital computer.

A further object of my invention is to provide a method of transmitting a voltage magnitude to a remote point.

A still further object is to provide an analog to digital converter of low cost and relatively high speed operation.

The invention will be described in connection with an analog to digital converter utilizing relay devices. An unknown voltage, representing data in analog form, is sequentially compared by switching means with systematically changing voltages which appear at different points of a series resistor system tapped across a fixed voltage source. The sum of the comparison voltages is increased or decreased by systematically reduced amounts until substantial balance is achieved between the measured voltage and the sum of the comparison voltages as indicated by a differential responsive means. A plurality of relays is used to short out resistances which would raise the comparison voltages above the measured voltage, and to transmit the results of a comparison to the next succeeding measurement in order to prevent duplication of measurements.

A feature of the invention is a provision for maintaining the load on the voltage source constant by inserting in the series resistor system, resistance equal to that shorted out, but at a point which does not affect the measurements; thus maintaining the accuracy of the device.

Another feature of my invention is a simplified method and apparatus for rounding off the measurement to the number of digits intended for reading by providing the last comparison voltage point to have a voltage of only half that normally determined by the systematic changes.

A typical device used in the practice of my invention comprises a circuit arrangement for recording the unknown voltage magnitude in binary numerical form, the respective places of the number being represented by a "1" or a "0" as will be explained more fully below. A resistor network is connected to a standard voltage source, the network having an upper arm and a lower arm. The upper arm comprises a plurality of sections of predetermined ohmic value in accordance with the accuracy desired, the intersection of adjacent sections defining a plurality of points along the upper arm. The lower arm also contains a plurality of sections of predetermined ohmic value equal in magnitude to corresponding sections of the upper arm. A plurality of relays is operatively associated with the sections, one with each equal pair of upper and lower arm sections respectively. Each relay comprises normally open upper arm section shunting contacts, normally closed lower arm section shunting contacts, and holding contacts to maintain the relays closed after operation; open holding contacts indicating a "1" and closed holding contacts indicating a "0" as shown by indicating devices, each in parallel with one relay. A differential amplifier is provided, the amplifier having first and second inputs and an output line. A normally open circuit output relay is positioned in the output line. This output relay is sequentially connected in circuit relation with each of the other relays. The unknown voltage is connected to the second input of the amplifier. Suitable means are then provided for automatically connecting each of said points in succession to the first input, whereby when the voltage appearing on the first input is less than the unknown voltage on the second input, the differential closing means completes the circuit to the respective relay, causing the relay holding contacts to close, the upper arm shunting contacts to close, and the lower arm shunting contacts to open.

Other objects, features and advantages will appear in the subsequent detailed description which is accompanied by a drawing, wherein:

Fig. 2 is a table utilized to explain the operation of the invention.

Fig. 3 is another table utilized to explain the operation of the invention.

Fig. 4 shows another embodiment of the invention illustrated in Fig. 1.

Figure 1:
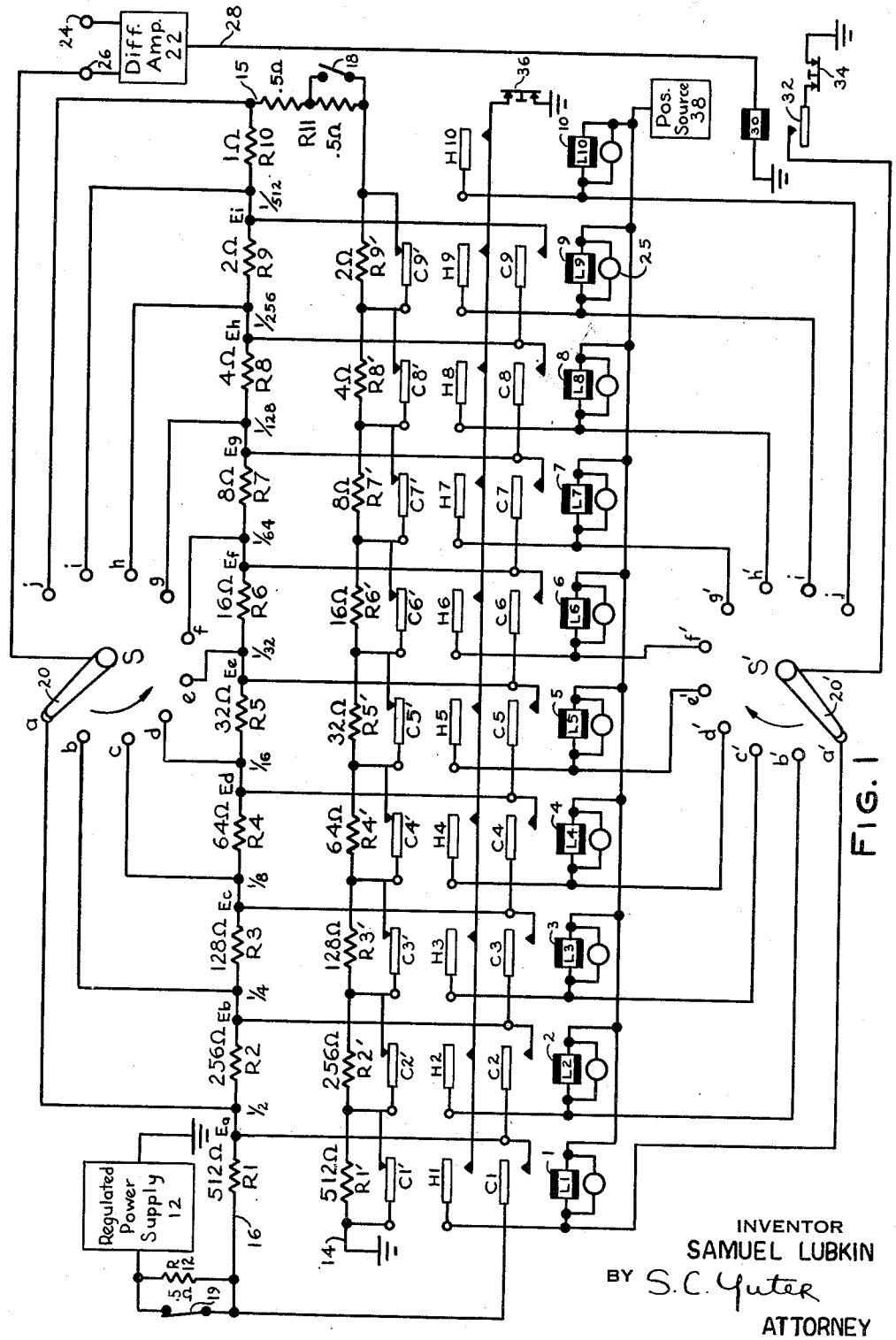
Fig. 1 shows schematically an illustrative embodiment of my invention.

In order to aid in the description of the invention the structure and operation will be described after a brief reference to the binary system of computation.

The binary system of computation is particularly suited to electronic computers since a complete binary order of a binary number may be expressed in terms of the opening or closing of a relay, or the conducting or nonconducting condition of the anode circuit of a conventional vacuum tube.

It is known that a number N is represented in the binary arithmetic system by the following formula:

$$N = A_n(2^n) + A_{n-1}(2^{n-1}) + \ldots + A_1(2^1) + A_0(2^0) + A_{-1}(2^{-1}) + \ldots + A_{-n}(2^{-n})$$

in which the constants $A_n, A_{n-1}, \ldots A_{-n}$ are integral coefficients smaller than the number 2; so that the only figures in the binary system are 0 and 1, and the point is between $A_0$ and $A_{-1}$. For instance, the number 23, which can be written:

$$23 = 1(2^4) + 0(2^3) + 1(2^2) + 1(2^1) + 1(2^0)$$
$$= 16 + 0 + 4 + 2 + 1$$

is written: 10111. in the binary system with the point at the right. The point is more accurately termed the binary point as compared with the decimal point in the decimal system.

Similarly, the fraction $5/32$ which can be written:

$$5/32 = 0(1^{-1}) + 0(2^{-2}) + 1(2^{-3}) + 0(2^{-4}) + 1(2^{-5})$$
$$= 0 + 0 + 1/8 + 0 + 1/32$$

is written: .00101 with the binary point at the left. It should be noted from the fractional portion of the formula that each successive step in the summation differs from the prior step by a factor of ½.

Summarizing, the decimal number $23\ 5/32$ is written: 10111.00101 in the binary system.

Referring now to Fig. 1, a standard voltage supply 12 is connected in series with a resistor network. In accordance with the teachings of my invention, the network serves as a potentiometer and includes a lower arm 14, an intermediate arm 15, and an upper arm 16. The upper arm 16 comprises a plurality of resistance sections R1, R2 . . . R10. The intermediate arm is a single section R11 comprising two resistors in series, while the lower arm comprises a plurality of sections R1', R2' . . . R9'.

Each section of the upper and lower arms respectively has a predetermined ohmic value selected in accordance with the chosen numerical representation of the magnitude of the unknown voltage. The section R11 in the intermediate arm has an absolute value such that an effect is achieved which is equivalent to the well known mathematical process of "rounding off" a number when the switch 18 is in closed position. The section R12 is shorted by switch 19 during non-round off operation. This will be explained later in greater detail.

The sections of the lower arm 14 have ohmic values which are different one from another, but they are equal in magnitude respectively to complementary sections in the upper arm 16. It will be noted that there is no section of the lower arm corresponding to section R10 of the upper arm since its inclusion in the circuit is unnecessary as will be explained below.

The upper, intermediate and lower arms are connected in series as shown in Fig. 1, to form a resistance network, one end of the network being grounded and the other end of the network being connected to the standard voltage supply 12; the other side of the standard voltage supply being also grounded.

A solenoid operated rotary stepping switch comprises an upper deck stepping switch S and a lower deck stepping switch S'. The upper switch S includes a plurality of contact posts $a, b, c, \ldots j$, each of these posts being connected to the intersection of adjacent sections along the upper arm. Similarly the lower switch S' contains a plurality of contact posts $a', b', c', \ldots j'$, each of these latter posts being connected to one end of relay coils L1, L2, . . . L10, respectively, of relays 1, 2, . . . 10. The switches may also be of the commutator type. An indicating lamp 25 is connected in parallel with each relay holding coil and indicates the energization of the respective relays when lighted.

The upper and lower switches S and S' are provided with stepping switch members 20 and 20', respectively. These switch members rotate continuously in unison from one contact post to the next, but in opposite directions; that is, member 20 rotates counterclockwise and member 20' rotates clockwise. The members are shown as oppositely rotating primarily for description purposes. In actual operation both members rotate in the same direction and are driven by a common shaft choosing posts in increasing alphabetical order.

A differential amplifier 22 of conventional circuit design comprises a first input 24, a second input 26, and an output line 28. The unknown voltage is applied between input terminal 24 and ground. Input terminal 26 is connected to stepping switch member 20, and through member 20 it is successively connected to the defined points E$a$, E$b$, . . . E$j$ along the upper arm 16 of the resistor network by means of the contact posts $a, b, \ldots j$.

An output relay 30 is positioned between the output line of the amplifier and ground. Relay 30 includes contacts 32 which are normally open. These contacts are connected in series with stepping switch S' and the switch or circuit interrupting means 34. The remaining terminal of switch 34 is connected to ground. Switch 34 is automatically coordinated with the stepping switches S and S' and may comprise an additional set of contacts on the stepping switch. The switch 34 (also known as a sampling switch) is normally in open position and operates to prevent spurious signals appearing on the line 28 from being communicated to member 20' during transition of the stepping switches S and S' from one position to another. The device is arranged so that switches S and S' step to one position, then switch 34 closes for the measurement to be made, then switch 34 reopens before switches S and S' step to the next position.

Referring to the relays 1, 2, . . . 9, these are of identical construction, so that a description of one will suffice for all. The typical relay 1 comprises coil L1, normally open upper arm section shunting contacts C1, normally closed lower arm section shunting contacts C1', and holding contacts H1. As will be seen in Fig. 1, shunting contacts C1 are connected in parallel with upper section R1. Similarly, shunting contacts C1' are connected in parallel with lower section R1'. The coil L1 is connected at one end to a source of positive potential 38, while the other end is connected to the movable element of holding contacts H1. The fixed element of holding contacts H1 is connected in parallel with the fixed elements of the other contacts H2, . . . H10 and in series with switch or circuit interrupting means 36.

Relay 10 comprises coil L10 and holding contacts H10, the other contacts corresponding to the contacts C1 and C1' being omitted for reasons which will be presently explained. In the practical embodiment, the relay contacts may be of the spring leaf type, or the like, the whole being integrated into any convenient compact unit.

The circuit operates in the following manner:

In the interests of simplicity let it be assumed that the unknown voltage can have a maximum value of only 1 volt. Then the standard voltage source 12 is chosen to have a magnitude of 1 volt and is highly regulated. Further, the arm sections have the respective resistance magnitudes shown in the drawing. In the initial position of the device, switch 34 is open and switch 36 is closed. At each of relays 1, 2 . . . 9 upper section shunting contacts C1, C2, . . . C9 are open, lower section shunting contacts C1', C2', . . . C9' are closed, and holding contacts H1, H2, . . . H9 are open. At relay R10, holding contacts H10 are open. The stepping switch members S and S' of the upper and lower decks are at their initial respective contact posts $a$ and $a'$.

As will be seen from Fig. 1, the lower arm 14 of the resistor network is completely shorted out through the agency of closed shunting contacts C1', C2', . . . C9'. An unknown voltage (or a voltage representing a given analog quantity to be rapidly converted) is now applied to input terminal 24 of the differential amplifier 22. At the other input terminal 26 the voltage E$a$ appearing between ground and the junction of sections R1 and R2, and ground is applied via switch S at position $a$. As will be observed from a study of Fig. 1, the voltage E$a$ at the junction of R1 and R2 is ½ volt since 512 ohms is one half of the total resistance (1024 ohms) in the circuit.

The operation of the differential amplifier 22 is well known in the art and does not require extensive explanation. Briefly, the amplifier compares the voltages appearing at its inputs 24 and 26. It is adjusted so that if the voltage at the input 26 is less than the unknown voltage at the second input 24, that is, the unknown voltage in this comparison is equal to or greater than $Ea$, then a voltage output appears on output line 28, causing circuit closing relay 30 to operate. If the unknown voltage is less than the voltage at the input 26, then no output appears at output 28 and contacts 32 remain open.

First, let us consider the case where the voltage at input 24 is greater than the voltage $Ea$ at input 26. As previously stated, this causes an output on line 28 so that relay 30 operates (i. e. contacts 32 close). Upon the closing of switch 34, the circuit for the coil L1 of relay 1 is now completed from the positive potential source 38 via coil L1, member 20', contacts 32, switch 34, to ground. Coil L1 is energized; holding contacts H1 now close maintaining the relay 1 in energized position by grounding coil L1 via switch 36, and the contacts will remain closed until the circuit is interrupted at switch 36. When coil L1 is energized contacts C1 close and contacts C1' open. The indicating lamp 25 associated with relay 1 is lighted.

The lighting of the lamp indicates that the unknown voltage is equal to or greater than ½ volt. The closed upper shunting section contacts C1 now short out section R1, while at the same time the lower shunting section contacts C1' insert section R1' (having the same ohmic value as R1) at the other end of the resistor network to maintain the total resistance constant. The stepping switches S and S' are then simultaneously advanced to the second position, stepping switch member 20 is now at post $b$, and stepping switch member 20' is at post $b'$. The comparison voltage $Eb$ at the junction of sections R2 and R3 is now ¾ volt. This is because the voltage $Ea$ is now equal to 1 volt (since section R1 is shorted) and the voltage drop across section R2 is ¼ volt (since the current through the resistor network is maintained constant by maintaining the total resistance constant).

Next, consider the second possibility, that is, the voltage on input 26 is greater than the unknown voltage on input 24. In this situation (with the switches at posts $a$ and $a'$) no output appears on line 28, and contacts C1 remain open. Thus the coil L1 is not energized and the associated lamp does not light. The shunting contacts C1 remain closed. Then the stepping switches S and S' are simultaneously advanced to the second position, stepping switch member 20 being at contact post $b$, and stepping switch member 20' being at post $b'$. The comparison voltage $Eb$ at the junction of sections R2 and R3 is now ¼ volt. (The voltage drop across sections R1 and R2 is equal to ¾ volt.)

If the second comparison (at the R2—R3 junction) shows the unknown voltage to be greater than ¼ volt (or ¾ as in the first case) then holding contacts H2 will close, the upper arm section R2 will be shorted out, and the lower arm section R2' will be inserted into the circuit on the other end of the network upon the opening of contacts C1'. If the unknown voltage is less than ¼ volt (or ¾ volt as the case may be), the component parts of relay 2 will remain in their respective normal positions, the net result of the comparison being signified by the nonlighting of the indicating lamp associated with relay 2.

At this point several observations can now be made concerning the illustrative embodiment shown in Figure 1. Thus it will be noted that the unknown voltage is actually measured as a proportion of the standard voltage 12, the absolute accuracy of the measurement being limited only by the accuracy of calibration of the standard voltage supply, the individual resistors of the network, and by the response of the differential amplifier. It is also evident that the section shunting contacts C1 and C1' serve two purposes: (1) they set the voltage at the next defined point on the upper arm to the value appropriate in view of the result of the preceding comparison, and (2) they maintain the total resistance of the network constant, thereby maintaining a constant load on the standard voltage supply and a constant current through the network. Additionally, the relays 1, 2, . . . 10 become self-holding once energized and thus store or "remember" the reading as indicated by the lamps.

The process of comparing the voltages at inputs 24 and 26 continues successively until the comparisons are completed. The energizing of any one of relays 1, 2, . . . 9 inclusive causes the voltage at the next comparison point along the upper arm to increase by the next appropriate increment, while the nonenergizing of a relay will result in the next voltage being lowered by a like amount. Thus each successive comparison depends upon the result of the one preceding it, and unnecessary comparisons are avoided.

Since in the illustrated situation no comparison follows the tenth comparison, the upper and lower shunting contacts and the lower arm section corresponding to upper section R10 are all unnecessary and hence are omitted. As will be explained more fully below, when all comparisons are complete, the group of relays 1, 2, . . . 10 inclusive will represent by their respective indicating lamps, the successive numerical representation of the magnitude of the unknown voltage. Relay 1 corresponds to the most significant place of the number, and relay 10 to the least significant place.

At the completion of the comparison measurements, switch 36 is opened by automatic means not shown in the drawing but associated with the stepping switches; the apparatus is now cleared and ready to begin comparison of the magnitude of a new unknown voltage.

For purposes of illustrating my invention, it has been assumed that the numerical information is desired in binary form. The word binary may cause some confusion since it is used in at least two senses. In one sense "binary" indicates that two conditions are possible, such as "on" and "off" positions. In this particular sense my device may be said to record the information in binary form since lighted indicating lamps indicate one position (i. e. a "1" in the numerical representation), while unlighted indicating lamps indicate another position (i. e. a "0" in the numerical representation).

In the other sense "binary" means a number system having a radix 2 as explained earlier. In this latter sense my device records the numerical information in binary form, since the ohmic values of sections R1, R2, . . . R10 of the upper arm have respective magnitudes based on powers of 2. For example:

$2^9 = 512 = R1$         $2^4 = 16 = R6$
$2^8 = 256 = R2$         $2^3 = 8 = R7$
$2^7 = 128 = R3$         $2^2 = 4 = R8$
$2^6 = 64 = R4$          $2^1 = 2 = R9$
$2^5 = 32 = R5$          $2^0 = 1 = R10$

However it will be understood that my device is not limited to the representation of information in the binary form (radix 2). Thus while the information is recorded in binary form in the first sense, the individual indicating lamps may be arranged in groups so as to record the desired information in the decimal scale (radix 10), the octinary scale (radix 8) or the sexadecinary scale (radix 16).

Assume now that the numerical representation of the unknown voltage is desired in binary form (radix 2). As previously stated let it be further assumed that the unknown voltage can have a maximum voltage of one volt. Recalling that lighted indicating lamps indicate a "1," while unlighted indicating lamps indicated a "0," a "1" in the first significant place indicates a value of ½ volt or more, while a "0" will indicate a magnitude less than ½ volt. The other numerical positions are similarly represented by appropriate magnitude. For example, a "1" in the second position indicates an additional increment of ¼ or more volt, and a "0" indicates that the additional increment is less than ¼ volt. If only two positions are used four representations are possible with the following interpretations:

11 indicates ¾ volt or more;
10 indicates ½ volt or more, but less than ¾ volt;
01 indicates ¼ volt or more, but less than ½ volt;
00 indicates less than ¼ volt.

Figures 2 and 3 are tables indicating the results of typical operations, the examples are chosen in order to give a correct reading in six binary places. For purposes of the description, switch 18 is open and arm 15 then has a resistance equal to 1 ohm. Switch 13 is usually closed and arm 15 is normally equal to ½ ohm to perform a "round off" operation as will be explained hereinafter.

Referring to Figure 2, an unknown voltage X will be measured (for example purposes) in a series of six steps, $a$ to $f$. The six columns entitled to $Ea$ to $Ef$ indicate the respective voltages at the associated section junctions (see Figure 1) before the result of the comparison is transmitted to the associated relay. The particular comparison voltage of each step appears on a diagonal from the upper left and across the voltage indication section.

The next two succeeding columns show whether the unknown voltage X is less than, or equal to or greater than, the selected junction voltage E. If the latter is the case, the associated relay will be operated as shown in the following column.

The next six narrower columns represent the indicating lamps which light when their associated relays are operated. The last column represents the sum of the binary indications at the end of a particular step. The result at the end of the last step $f$ in the last column is the final answer.

It should be noted that initially the voltage drop across each resistance section decreases by an amount equal to one half the prior voltage drop, and that the first voltage drop is ½ volt. Voltage $Ea$, therefore, is equal to the difference between the supply voltage (1 volt) and the voltage drop across section R1 (½ volt).

At step $a$, that is, with switch members 20 and 20′ at posts $a$ and $a'$, respectively, the voltage X to be measured (which turns out to be 9/16 volt) is compared with the voltage $Ea$ or ½ volt. Since voltage X is greater than voltage $Ea$, relay 1 operates and the associated lamp 25 is lighted to give the first binary digit (1) following the binary point. Since the section R1 is now shorted out, the voltages $Ea$ to $Ef$ increase by the original voltage drop across R1. This is the case because the current in the resistance network remains constant for the reason that section R1′ is inserted when the contacts C1′ open.

At step $b$, the comparison voltage $Eb$ is now ¾ volt so that the unknown voltage is of smaller magnitude; therefore, relay 2 remains inoperative and the second binary digit (0) is indicated. There is no change in the voltages $Ea$ to $Ef$.

At step $c$, voltage $Ec$ is also of smaller magnitude, relay 3 is inoperative and the third digit (0) is determined. Voltages $Ea$ to $Ef$ remain the same.

At step $d$, voltage $Ed$ (9/16) is equal to voltage X (9/16); relay 4 operates and the fourth digit (1) is indicated. The binary sum is now 9/16. The voltages $Ed$ to $Ef$ are increased by an amount equal to 1/16 volt, the drop across the section R4.

At steps $e$ and $f$, the voltage X is less than the comparison voltage and the fifth (0) and sixth (0) digits are determined. The final result is 9/16 volt as indicated by the number .100100 in the binary system. The relays are then cleared by the automatic operation of switch 36 (by means not shown) and the switches S and S′ are in position to determine the next voltage magnitude.

Figure 3 illustrates a further example and is self-explanatory when the above procedure is followed.

In addition to the visual display of the lamp indication of the digital value of the voltage, auxiliary contacts on the relays may be used to produce corresponding electrical potentials for transmission to a remote point or to a computing device.

It will be noted that the respective sections of the lower and upper arms are arranged in decrements corresponding to the number system being used (in the illustrative cases in descending powers of 2), so that each successive section (with the exception of the last) has a resistance equal to the sum of all the following sections. Intermediate section R11 would normally have a resistance value of 1 ohm to make the total resistance an even amount and to make each section a fractional value of the total resistance. However, by making R11 equal to ½ ohm, an effect is achieved which is equivalent to the mathematical process of "rounding off." The digital equivalent of the unknown voltage magnitude is then "rounded off" to the chosen number of places (10 in the illustrative case).

This will be understood by observing the fact that the usual mathematical process of "rounding off" a number may be accomplished by adding one half of the value of the radix to the next lower or less significant place beyond the number of significant figures desired, and then taking the desired significant figures in the resulting sum as the answer, without further adjustments. The "rounded off" provision of the invention is put into operation by simply closing switch 18 and simultaneously opening switch 19. This maintains the total resistance equal to 1024 ohms by replacing the shorted .5 ohm resistor with the resistor R12 of the same magnitude.

To illustrate how the "round off" feature operates, first assume that there was no "round off" provision. Suppose the unknown voltage X is equal to $$\frac{.6}{1024}$$

volts. Therefore, as explained above, as the comparisons are made, each relay 1, 2, . . . 9 will remain inoperative since the voltage X is less than the voltages $Ea$ to $Ei$. At the last comparison the voltage $Ej$ is equal to $$\frac{1}{1024}$$

volts. Since voltage X is less than voltage $Ej$, relay 10 will not operate, thus indicating a resultant voltage of zero.

With the "round off" provision, relays 1, 2, . . . 9 are still inoperative since the small order of change of resistance due to the addition of resistor R11 is insignificant for the first nine comparisons. However, voltage X $$\left(\frac{.6}{1024}\right)$$

is now greater than voltage $Ej$ $$\left(\frac{.5}{1024}\right)$$

so relay 10 operates and the indicators show the result rounded off as $$\frac{1}{1024}$$

volts. Similarly, if voltage X is equal to or greater than $$\frac{.5}{1024}$$

relay 10 will operate. Where voltage X is less than $$\frac{.5}{1024}$$

relay 10 will not operate.

Summarizing, what this feature effectively does is to add $$\frac{.5}{1024} \text{ volts} \left(\frac{1}{2048}\right)$$

or one-half the voltage of the last significant place to the unknown voltage; and the eleventh place is not computed. In practice, of course, the "round off" provision is utilized during normal operation of the invention.

Therefore, the calibration of the resistors, the regulation of the voltage supply, and the response of the differential amplifier in combination must be such as to accurately indicate a difference of at least $$\frac{1}{2048}$$

of a volt. Of course, if the voltage of the regulated source, and the maximum available unknown voltage were increased, say one hundredfold, the required voltage sensitivity would be increased by the same amount $$\left(\frac{100}{2048}\right)$$

Since the operation of the device involves a comparison of two magnitudes, there can be only two possible results; the first magnitude is equal to or greater than, or less than the second. Thus the particular number system used must be adapted by coding it in binary fashion.

To represent or code a decimal digit directly in binary fashion in order to provide greater flexibility, at least four relays must be used to indicate the ten possible values of the individual digits; but these relays may be chosen in a number of different ways. For example, the relays may be chosen in the following manner: 8–4–2–1, 4–2–2–1, 5–2–1–1, 4–3–1–1. To explain this more fully, let us consider the 5–2–1–1 combination. The coded group is arranged in binary form, and then the quantity represented by each group of four relays is multiplied by 1, 10, 100, etc., so that the individual relays have weighted values as follows:

Relay Group 1; 1(5–2–1–1)= 5   2   1   1
Relay Group 2; 10(5–2–1–1)= 50   20   10   10
Relay Group 3; 100(5–2–1–1)=500   200   100   100

Therefore, if 1 indicates the operation of a relay and 0 indicates inoperative, then the indication 0110 1000 0100 is equal to (0+200+100+0)+(50+0+0+0)+(0+2+0+0)

Thus the number shown in the illustrative example above would have an absolute value equal to 352.

Similarly, if more than four relays are used, they can represent such combinations as 5–1–1–1–1, 2–2–2–2–1, etc. The maximum number of relays per decimal digit is nine, each representing an increment of one. In general for any radix, the maximum number of relays per number place is one less than the radix. Whatever arrangement is used, the values represented by the relays for a given numerical place should be either equal or progressively decreasing in the direction of successive comparisons.

Another embodiment of my invention is shown in Figure 4 and operates to record the unknown voltage magnitude in decimal form in accordance with the above 5–2–1–1 code. Both embodiments are substantially the same except that the upper and lower arms 14 and 16 have been replaced by arms 14' and 16'.

Upper arm 14' comprises the sections T1, T2, . . . T8 having the indicated resistances. Lower arm 14' comprises the sections T1', T2', . . . T7' having the indicated resistances.

The decimal embodiment functions in exactly the same way as the binary embodiment. That is, the sections T1, T2, T3 and T4 determine the tens digit and the sections T5, T6, T7 and T8 determine the unit digit. Of course, fewer positions on switches S and S' are required unless additional decimal digits are provided for. In that case, four resistance sections and the associated components would be necessary for each additional digit.

The invention has been described in terms of stepping switches and relays primarily for description purposes. These devices may be replaced by their electronic counterparts in any system where faster operation is required.

The operation time for a complete measurement, utilizing standard stepping switches and relays is in the order of ¼ second. This measurement time could be reduced to approximately two milliseconds if the following electronic replacements were made: a counter, preferably of the ring type, for the stepping switches; flip-flop circuits, magnetic "memory" elements, or other suitable bistable devices for the relays coils and holding contacts; and electronic gating circuits, such as those using multigrid tubes or crystal diodes, for the shunting relay contacts, the sampling switch and the clearing switch.

Thus my invention can automatically and rapidly, and at a relatively low cost, convert analog quantities into rounded off digital form for use in a digital computer, or for transmission to a remote point, since unnecessary comparisons are eliminated.

In the foregoing I have described my invention solely in connection with specific illustrative embodiments thereof. Since many variations and modifications of my invention will now be obvious to those skilled in the art, I prefer to be bound not by the specific disclosures herein contained, but only by the appended claims.

What is claimed is:

1. A voltage indicating device for obtaining the magnitude of an unknown voltage in binary coded form, the respective places of the number being indicated by a "1" or a "0," comprising in combination, a standard voltage source, a resistor network, said resistor network being connected to said source, said network having a first arm and a second arm connected in series, said first arm having a plurality of sections of predetermined ohmic value, a plurality of points along said first arm, said points being defined by the junction of adjacent sections of the first arm, said second arm also having a plurality of sections of predetermined ohmic value equal in magnitude to corresponding sections of the first arm, a plurality of switching means, said means being operatively associated with each complementary pair of equal sections, each switching means comprising normally open first arm section shunting means, normally closed second arm section shunting means, and indicating means to indicate a "1" or a "0" associated with each of said switching means, a differential amplifier, said amplifier having a first input, a second input and an output line, the unknown voltage being applied to the second input, and a normally open differential circuit closing means, said closing means being positioned in said output line and connecting in circuit relation with each of said switching means.

2. A voltage indicating device for obtaining the magnitude of an unknown voltage in binary coded form, the respective places of the number being indicated by a "1" or a "0," comprising in combination, a standard voltage source, a resistor network, said resistor network being connected to said source, said network having a first arm and a second arm connected in series, said first arm having a plurality of sections of predetermined ohmic value, a plurality of points along said first arm, said points being defined by the junction of adjacent sections of the first arm, said second arm also having a plurality of sections of predetermined ohmic value equal in magnitude to corresponding sections of the first arm, a plurality of switching means, said means being operatively associated one with each complementary pair of equal sections, each switching means comprising normally open first arm section shunting means, normally closed second arm section shunting means, and indicating means to indicate a "1" or a "0" associated with each of said switching means, a differential amplifier, said amplifier having a first input, a second input and an output line, the unknown voltage being applied to the second input, a normally open differential circuit closing means, said closing means being positioned in said output line and connecting in circuit relation with each of said switching means, and means for successively connecting said points to said first input, whereby when the voltage appearing on said first input exceeds the voltage on the second input, said differential closing means completes the circuit to the respective switching means causing the switching means to operate and the indicating means to energize, the first arm shunting means to close and the second arm shunting means to open.

3. A voltage indicating device according to claim 2 wherein the means for successively connecting said points is a rotary switch, said switch comprising a first deck, second deck, and switching members one with each deck, said decks having a plurality of contact posts, said switching members being mounted for continuous rotation in unison so as to successively engage said contact posts respectively, the lower deck contact posts being connected to said points on the lower arm, and the upper deck contact posts being connected respectively to said plurality of switching means.

4. A voltage indicating device for obtaining the magnitude of an unknown voltage in binary coded form, the respective places of the number being indicated by a "1" or a "0," comprising in combination, a standard voltage source, a resistor network, said resistor network being connected to said source, said network having a first arm and a second arm connected in series, said first arm having a plurality of sections of predetermined ohmic value, a plurality of points along said first arm, said points being defined by the junction of adjacent sections of the first arm, said second arm also having a plurality of sections of predetermined ohmic value equal in magnitude to corresponding sections of the first arm, a plurality of relays, said relays being operatively associated one with each complementary pair of equal sections, each relay comprising normally open first arm section shunting contacts, normally closed second arm section shunting contacts, and indicating means to indicate a "1" or a "0," associated with each of said relays, a differential amplifier, said amplifier having a first input, a second input and an output line, the unknown voltage being applied to the second input, a normally open differential circuit closing means, said closing means being positioned in said output line and connecting in circuit relation with each of said relays, and means for successively connecting said points to said first input, whereby when the voltage appearing on said first input exceeds the voltage on the second input, said differential closing means completes the circuit to the respective relays, causing the relay to operate and the contacts to energize, the first arm shunting contacts to close and the second arm shunting contacts to open.

5. A voltage device according to claim 4 in which the section of the second arm corresponding to the least significant place in said binary code form is replaced by an intermediate section, said intermediate section comprising a single resistance having an ohmic value such that the mathematical process of rounding off the numerical representation is effected by the last comparison.

6. A voltage device according to claim 4 wherein the sections of the first and second arms respectively have absolute values equal to $2^n, 2^{n-1}, \ldots 2^0$, where $n$ is the number of comparisons desired.

7. A voltage indicating device for indicating the magnitude of a voltage in binary number form comprising a voltage source, a resistor network connected to said voltage source, said network having a first arm and a second arm connected in series, said first arm having a plurality of sections of predetermined ohmic value, a plurality of comparison voltage points along said first arm, the comparison voltages of said voltage points diminishing in magnitude in accordance with a predetermined scale, said second arm also having a plurality of sections of predetermined ohmic value, each section being equal in magnitude to the corresponding section of said first arm, means for sequentially comparing the voltage to be indicated with each of the comparison voltages at said voltage points, switching means for shorting out the associated section and thereby increasing the comparison voltage at the next sequential voltage point and for inserting the corresponding section of said second arm to maintain the load constant on said voltage source when the voltage to be indicated is greater than the compared voltage, and indicating means associated with each of said switching means to indicate the actuation of said switching means in binary number form.

8. A voltage indicating device for indicating the magnitude of a voltage in binary number form comprising a voltage source, a resistor network connected to said voltage source, said network having a first arm and a second arm connected in series, said first arm having a plurality of sections of predetermined ohmic value, a plurality of comparison voltage points along said first arm, the comparison voltages of said voltage points diminishing in magnitude in accordance with a predetermined scale, said second arm also having a plurality of sections of predetermined ohmic value, each section of said second arm being equal in magnitude to the corresponding section of said first arm, a plurality of switching means, said switching means being operatively associated one with each pair of equal sections, means for sequentially comparing the voltage to be indicated with each of the comparison voltages at said voltage points, said plurality of switching means being operative to short out the associated section and increase the comparison voltage at the next sequential voltage point when the voltage to be indicated is equal to or greater than the compared voltage, and indicating means associated with each of said switching means to indicate in binary number form the actuation of said switching means.

References Cited in the file of this patent

UNITED STATES PATENTS

| | | |
|---|---|---|
| 2,023,221 | Fischer et al. | Dec. 3, 1935 |
| 2,244,257 | Maul | June 3, 1941 |
| 2,272,070 | Reeves | Feb. 3, 1942 |
| 2,313,752 | Le Clair | Mar. 16, 1943 |
| 2,451,044 | Pierce | Oct. 12, 1948 |
| 2,564,766 | Oberman | Aug. 21, 1951 |
| 2,582,349 | Oberman | Jan. 15, 1952 |
| 2,630,481 | Johnson | Mar. 3, 1953 |